(12) United States Patent
Vora et al.

(10) Patent No.: US 10,089,405 B2
(45) Date of Patent: *Oct. 2, 2018

(54) ADDRESSABLE NETWORK RESOURCE SELECTION MANAGEMENT

(71) Applicant: Amazon Technologies, Inc., Reno, NV (US)

(72) Inventors: Jinesh U. Vora, Issaquah, WA (US); Adam Brent Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/451,182

(22) Filed: Aug. 4, 2014

(65) Prior Publication Data

US 2014/0344290 A1 Nov. 20, 2014

Related U.S. Application Data

(63) Continuation of application No. 13/051,939, filed on Mar. 18, 2011, now Pat. No. 8,799,455.

(51) Int. Cl.
*G06F 15/173* (2006.01)
*G06F 17/30* (2006.01)
*H04L 29/08* (2006.01)
*G06Q 30/06* (2012.01)

(52) U.S. Cl.
CPC ..... *G06F 17/3089* (2013.01); *G06Q 30/0601* (2013.01); *H04L 67/22* (2013.01)

(58) Field of Classification Search
CPC ......... H04L 67/22; H04L 29/08; G06F 17/30; G06F 17/3089; G06F 15/173; G06Q 30/0601
See application file for complete search history.

(56) References Cited

U.S. PATENT DOCUMENTS

| | | | |
|---|---|---|---|
| 6,278,966 B1 * | 8/2001 | Howard | G06F 11/3414 703/22 |
| 2008/0288492 A1 * | 11/2008 | Gemmell | G06F 17/30884 |
| 2008/0306830 A1 * | 12/2008 | Lasa | G06Q 30/02 705/14.16 |

(Continued)

*Primary Examiner* — Cheikh Ndiaye
(74) *Attorney, Agent, or Firm* — Knobbe Martens Olson & Bear LLP

(57) ABSTRACT

A system and a method for the management of addressable network resources (e.g., Web pages, electronic documents accessed via a Uniform Resource Identifier, etc.) within a network are provided. Specifically, embodiments of addressable network resource selection systems and methods are disclosed for managing the analysis and identification of optimal links between addressable network resources. A resource selection component enables pruning of undesirable pages on the basis of various usage metrics, including user depart rate. The resource selection component may then identify optimal linking strategies by determining one or more linking scores for remaining pages based on any of a number of different page usage metrics. In other embodiments, addressable network resource selection systems and methods may weight linking scores to emphasize desired outcomes, such as encouraging exploration of a network-based site or encouraging high aggregate sales figures.

21 Claims, 8 Drawing Sheets

(56) References Cited

U.S. PATENT DOCUMENTS

| | | | |
|---|---|---|---|
| 2009/0300547 A1* | 12/2009 | Bates | G06F 17/30873 715/825 |
| 2010/0287152 A1* | 11/2010 | Hauser | G06F 17/30864 707/707 |
| 2012/0023390 A1* | 1/2012 | Howes | G06F 17/30864 715/205 |
| 2012/0124026 A1* | 5/2012 | Grois | G06F 17/30864 707/708 |
| 2012/0137201 A1* | 5/2012 | White | G06F 17/30899 715/205 |

* cited by examiner

ADDRESSABLE NETWORK RESOURCE SELECTION MANAGEMENT

CROSS-REFERENCE TO RELATED APPLICATIONS

This application is a continuation of U.S. patent application Ser. No. 13/051,939, filed Mar. 18, 2011, now U.S. Pat. No. 8,799,455, and entitled "ADDRESSABLE NETWORK RESOURCE SELECTION MANAGEMENT," the disclosure of which is incorporated herein by reference.

BACKGROUND

Network content providers that deal with high volumes of digital content often have difficulty prioritizing which Web pages or other addressable network resources containing digital content to present to a user. For network content providers that enable users to make purchases, this problem can translate into an inability to generate sales as users are presented with large numbers of Web pages including content that describe products they have little interest in buying. Users can be easily overwhelmed by choices and can find it difficult to identify a desired product in the absence of useful suggestions from the network content provider. Network content providers dealing with high volumes of products and content often try to provide useful recommendations to users by suggesting products based on past purchasing patterns and user interest.

In addition to product pages devoted to specific products, many network content providers maintain large numbers of browse pages linking to other product and browse pages. These browse pages allow a user to navigate through a site by following links from each page to the next. Since these browse pages may contain many links to other pages, and because a number of browse pages may link to any single other page, the network content provider may offer many more browse pages than product pages. In addition to the sheer quantity of browse pages, these pages are often not associated with specific products, and therefore lack associated purchasing data to generate appropriate user recommendations.

The combination of a high quantity of pages and the lack of explicit sales figures to drive a recommendation heuristic make it difficult for a network content provider to determine an optimal recommendation and linking strategy between pages. Additionally, a network content provider may wish to optimize a series of linked pages differently to meet different business or technical objectives depending on the purpose of the site. For example, it may be desirable to optimize browse and/or product pages for a new product to encourage user exploration and education, while in other cases it may be desirable to optimize browse and/or product pages for a well known product line to encourage a high user purchase volume.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
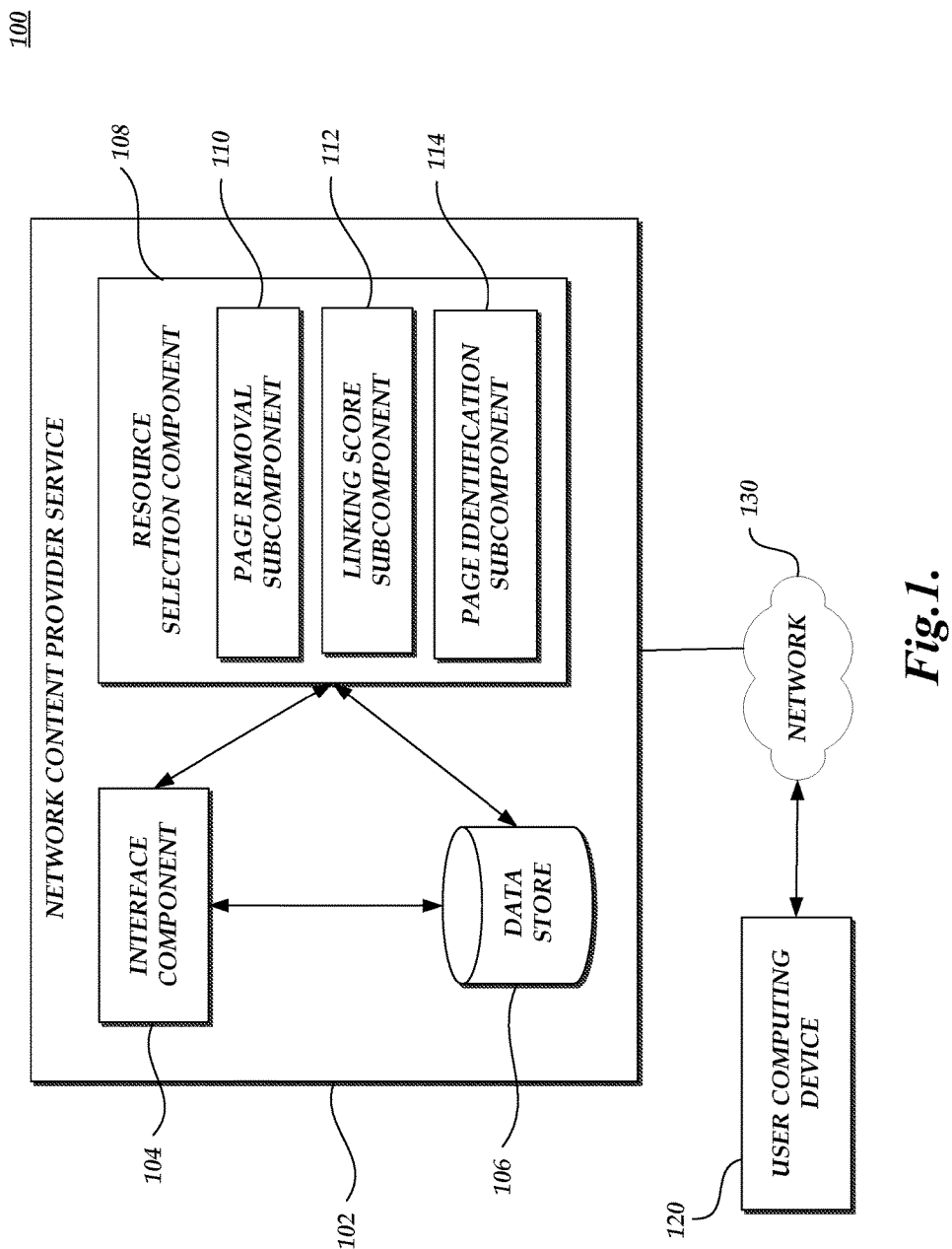
FIG. 1 is a block diagram depicting an illustrative embodiment of a computing environment implementing an addressable network resource selection system.

Generally described, the present disclosure is directed to the management of addressable network resources (e.g., Web pages, electronic documents accessed via a Uniform Resource Identifier, etc.) within a network. For purposes of brevity, such addressable network resources may be referred to herein as "pages." Specifically, embodiments of addressable network resource selection systems and methods are disclosed for managing the analysis and identification of optimal links between addressable network resources. A resource selection component is described herein that enables pruning of undesirable pages on the basis of various usage metrics, including user depart rate. In illustrative embodiments, the resource selection component may identify optimal linking strategies by determining one or more linking scores for remaining pages based on any of a number of different page usage metrics. In other embodiments, addressable network resource selection systems and methods may also weight the linking scores to emphasize desired outcomes, such as encouraging exploration of other pages or high aggregate sales figures.

In an illustrative embodiment, a network content provider may maintain a network-based site such as a Web site consisting of a large number of addressable network resources, such as Web pages, allowing users to access content and make purchases. For example, an illustrative network content provider may maintain a Web site with millions of individual Web pages. In various embodiments, each of these Web pages may each link to any number of other pages, and may represent products for purchase, categories of products or content, or any other information that is of potential interest to a user. Faced with this potentially vast number of Web pages and Web page links, the illustrative network content provider may have difficulty providing useful recommendations to users of the Web site.

Returning to the above illustrative example, in one embodiment the network content provider may collect usage data from the Web site's users. For example, the network content provider may keep records of every purchase made on the Web site and every link followed by a user. In one embodiment, the network content provider may then process this data to determine depart rates for each Web page associated with the site. Specifically, for the purpose of illustration, these depart rates may be determined from observations of user inactivity, such as a user failing to take any further action upon reaching a particular page. The illustrative network content provider may then use these depart rates to generate a subset of low-departure pages by culling Web pages with a depart rate determined to be over a particular threshold. This process may accordingly result in a subset of Web pages much smaller and more manageable than the original set of all pages associated with the site.

Continuing in this example, the network content provider may then determine one or more linking scores for each page in the subset of low-departure Web pages. These scores may be based on any number of different metrics as determined from the site usage data. For example, each Web page may be assigned a linking score based on the aggregate value of all purchases made from pages linked to by Web page, and a second linking score based on the rate at which users click through the Web page to access other areas of the site. In one embodiment, when a user accesses the Web site, the network content provider may select links to provide to the user on the basis of these linking scores. In some embodiments, these scores may be weighted based on data associated with the specific user, or on score weighting preferences associated with a particular objective for the site. For example, a network content provider providing a Web site for a new line of computer products may wish to encourage user exploration rather than sales. In this example, the network content provider may choose to weight a score based on click through rates higher than a score associated with purchase value. Although various aspects of the present disclosure will be described with regard to illustrative examples and embodiments, one skilled in the art will appreciate that the disclosed embodiments and examples should not be construed as limiting.

FIG. 1 is a block diagram depicting an illustrative embodiment of a computing environment 100 implementing an addressable network resource selection system. As illustrated in FIG. 1, the computing environment 100 includes one or more user computing devices 120 for requesting content from a network content provider service 102. In an illustrative embodiment, the one or more user computing devices 120 can correspond to a wide variety of computing devices including server computing devices, personal computing devices, laptop computing devices, hand-held computing devices, terminal computing devices, electronic book reading devices, tablet computing devices, mobile devices, wireless devices, various electronic devices and appliances and the like. In an illustrative embodiment, the one or more user computing devices 120 include necessary hardware and software components for establishing communications over a communication network 130, such as the Internet. Those skilled in the art will appreciate that the network 130 may be any wired network, wireless network or combination thereof. In addition, the network may be a personal area network, intranetwork, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The computing environment 100 can also include a network content provider service 102 in communication with the one or more user computing devices 120 via the communication network 130. In an illustrative embodiment, the network content provider service 102 may correspond to a network purchasing service offering products for sale over a network. The network content provider service 102 illustrated in FIG. 1 may be embodied in one or a plurality of computing components, each executing an instance of the network content provider service 102. A server or other computing device implementing the network content provider service 102 can include an interface component 104, as well as memory, processing unit, and computer readable medium drive (not shown), all of which may communicate with one another by way of a communication bus. The processing unit may communicate to and from memory containing program instructions that the processing unit executes in order to operate the network content provider service 102. The memory generally includes RAM, ROM, and/or other non-transitory, persistent and auxiliary computer-readable storage media. The interface component 104 may provide connectivity over the network 130 and/or other networks or computer systems. In addition, the interface component 104 may obtain and process requests for content (embodied in pages) from the one or more user computing devices 120. The network content provider service 102 typically replies to each request by serving content to the user computing devices 120 via the communication network 130.

The network content provider service 102 can further include a data store 106 for storing various data associated with the network content provider service 102. Illustratively, this content provider data may include sets of pages, user information, user and site usage data and traffic patterns, and various other types of data associated with the provision of content. The data store 106 may be distributed or partitioned across multiple storage devices as is known in the art without departing from the spirit and scope of the present disclosure. Moreover, while the data store 106 is depicted in FIG. 1 as being local to the network content provider service, those skilled in the art will appreciate that the data store 106 may be remote to network content provider service 102 and/or may be a network-based service itself.

With continued reference to FIG. 1, the network content provider service 102 can implement a resource selection component 108. In an illustrative embodiment, the resource selection component 108 can manage the selection and identification of recommended links between pages in a web site or other network user interface. Specifically, the resource selection component 108 may include a page removal subcomponent 110 for removing undesirable pages from sets of addressable network resources. Further, the resource selection component 108 may include a linking score subcomponent 112 for determining scores associated with one or more pages based on usage data associated with users or network resources. Still further, the resource selection component 108 may include a page identification subcomponent 114 for identifying optimal pages to be presented to a particular set of users and/or for purposes of a desired outcome. One skilled in the relevant art will appreciate that the components and subcomponents described above may be implemented in hardware and/or software, can be local or remote to the network content provider service 102, or can be implemented as network services themselves.

One skilled in the relevant art will appreciate that the network content provider service 102 can be associated with various additional computing resources, such as additional computing devices for administration of content and resources, DNS name servers, and the like. For example, although not illustrated in FIG. 1, the network content provider service 102 can be associated with one or more DNS name servers that would be authoritative to resolve user computing device DNS queries corresponding to a domain of the network content provider service 102.

Figure 2:
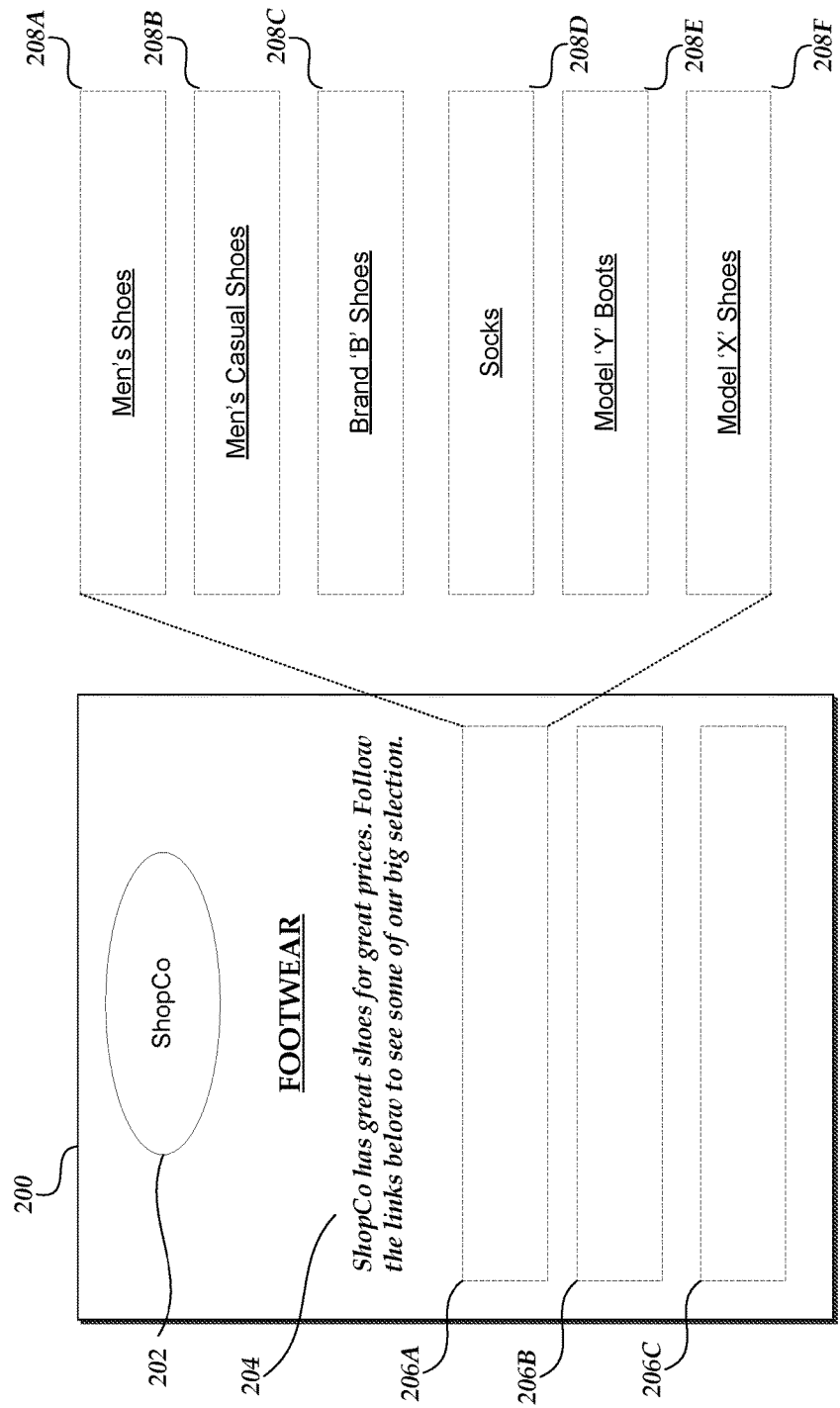
FIG. 2 is a schematic diagram of an illustrative addressable network resource.
Figure 3:
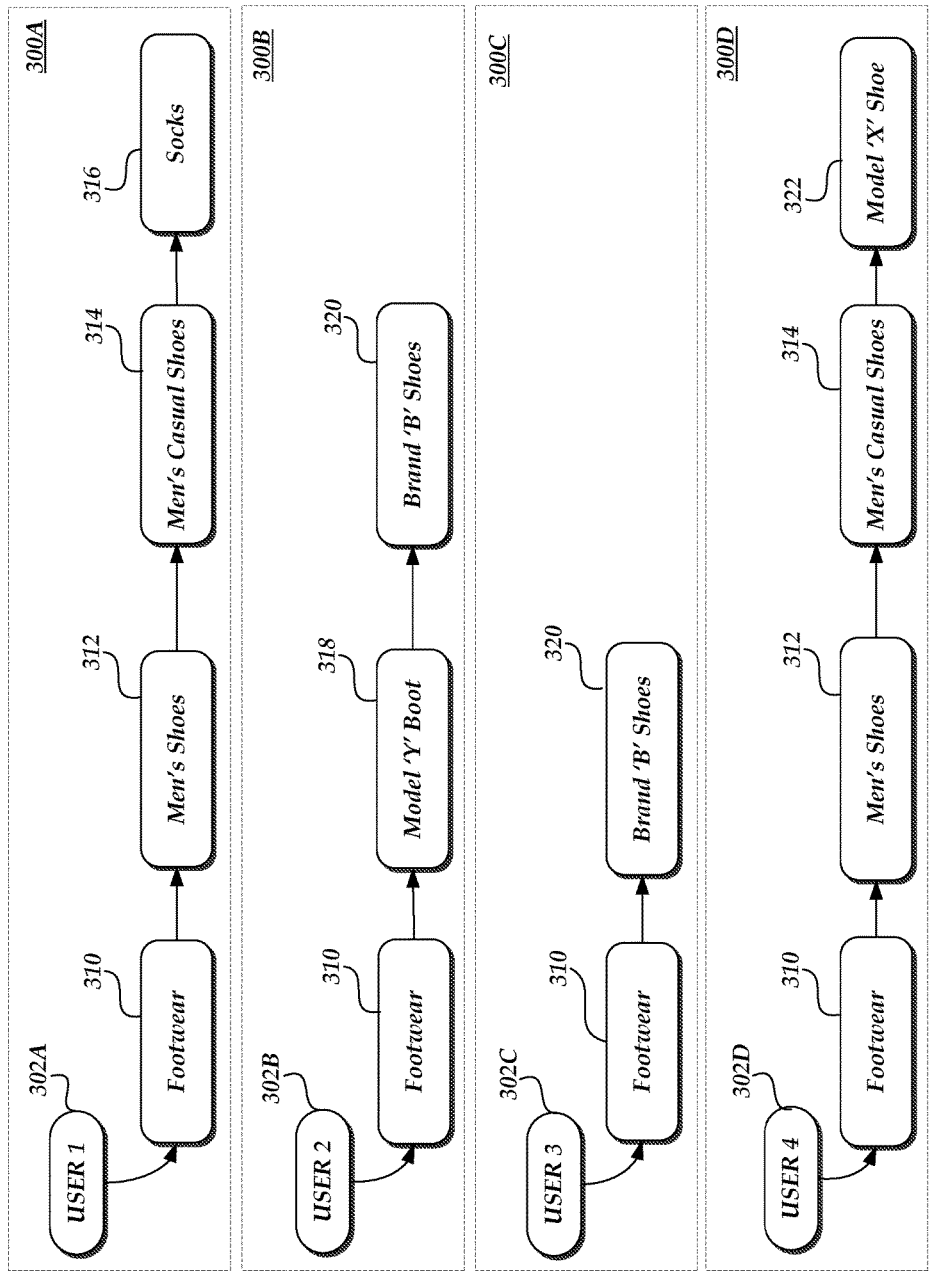
FIG. 3 is a schematic diagram of illustrative browse histories for a plurality of users.

With reference now to FIGS. 2-3, the interaction between users and various aspects of pages will be described. For purposes of example, however, FIGS. 2-3 have been simplified such that many of the features and components associated with the actual presentation of pages are not shown. One skilled in the relevant art will appreciate that such various further features and components may be utilized in the presentation and management of pages, and that additional interactions would accordingly occur without departing from the spirit and scope of the present disclosure.

With reference to FIG. 2, a schematic diagram depicting an illustrative embodiment of a typical addressable network resource 200 (e.g., a Web page) is shown. In the illustrated example, the page 200 may contain certain content that is included each time the page is presented, such as branding 202 and various additional content 204. The additional content 204 may include advertisements or content presented as text, images, audio, video, etc. In one embodiment, the page 200 includes content associated with a specific product or group of products and includes one or more fixed or dynamically determined links that enable a user to take some action (e.g., purchase, comment, add to a wish list or shopping cart) or obtain more information about such product or group.

Accordingly, the page 200 may include a number of dynamically determined slots 206A-206C, each of which can contain a link to another page selected by the resource selection component. For the purposes of illustration, six sample links 208A-208F to other pages are shown as candidates for slot 206A. One skilled in the relevant art will appreciate that there may be any number of links to candidate pages available for a particular slot, and the candidate pages may have been selected from a larger set of pages based on factors such as usage data associated with the pages and information regarding a current user. In one embodiment and as will be described in more detail below, the resource selection component 108 of FIG. 1 removes or disassociates one or more pages from the larger set of pages based at least in part on high user depart rates from said one or more pages in order to generate the set of candidate pages.

In one embodiment, a link to a page is selected from the set of links 208A-208F to candidate pages based at least in part on one or more linking scores (not shown) associated with the pages. In once embodiment, each page may be associated with one or more linking scores. However, in other embodiments, one or more pages may not be associated with linking scores due to a number of factors, including a lack of usage data and insufficient computational resources for score assignment, among others. Linking scores may be determined based at least in part on usage data, including but not limited to clickstream data, purchase data, promotional or assigned values or any other data associated with pages, the content contained therein, or associated products/services. For the purpose of this example, clickstream data may represent a record of any action taken by a user from a page.

In some embodiments, various usage metrics may be determined from the usage data and used to generate a linking score. These usage metrics may represent various rates, quantities, and values associated with various user actions or Web site activities, including but not limited to page click through rates, user depart rates, user purchase rates, customer satisfaction or customer review scores, shopping cart or wish list add rates, review add rates, comment add rates, link forwarding rates through e-mail or some other social media, product return rates, average or aggregate user purchase value or volume, average or aggregate profit, value of ad-driven revenue, or average time spent viewing. Illustratively, a linking score may be based on any usage metric or combination of usage metrics. For the purpose of example, pages associated with a brand of products may have a score associated with the aggregate sales figures for the respective brand, a score associated with user click-through rates to specific products of the brand, and a score associated with the average number of positive comments left for products of the brand, among others. In one embodiment, all candidate pages may have one or more linking scores assigned on the basis of the same user metrics in order to provide easy comparisons between pages.

In a further embodiment, linking scores may be weighted on the basis of a desired purpose or outcome. For example, the desired outcome may be to encourage user familiarity with a brand of a new line of products. Accordingly, a high weight may be assigned to a linking score that was generated based on user click-through rates of pages associated with the products. In another example, a high weight may be assigned to a linking score associated with the average number of sales per product per view, if the desired outcome is to encourage a high volume of product sales.

Turning now to FIG. 3, a schematic diagram of illustrative browse histories for a plurality of users is described. Illustratively, a user visiting a page may cause the network content provider service 102 to generate various usage data corresponding to user request and purchase data. These usage data may include user click-through records 300A-300D for a variety of users 302A-302D. One skilled in the relevant art will appreciate that one or more of the illustrative users 302A-302D may correspond to the same user, or alternately that each user 302A-302D may each correspond to different users. In one embodiment, each user click-through record 300A-300D may represent a browse history of a single user browse session accessing a Web site or other network resource. Each user click-through record 300A-300D may correspond to a series of pages 310-322 based at least in part on a sequence of pages visited during a browse session. For purposes of example, a browse session for a user 300A may show that the user visited a page 210 associated with Footwear, followed a link to a page 312 associated with Men's Shoes, followed a link to a page 314 associated with Men's Casual Shoes, and finally followed a link to a page 316 associated with Socks. One skilled in the relevant art will appreciate that user click-through records may be generated for each user, but that there may additionally be any number of user click-through records corresponding to different browse sessions of a single user.

In one embodiment, user click-through records 300A-300D may be used to determine user depart rates for various pages. For purpose of example, user click-through record 300B shows that a user 302B visited a page 310 associated with Footwear, followed a link to a page 318 associated with Model 'Y' Boots, and subsequently followed a link to a page 320 associated with Brand 'B' Shoes. If there are no further user actions corresponding to a user 302B after visiting the page 320 associated with Brand 'B' Shoes, a user departure may be identified corresponding to the page 320 associated with Brand 'B' Shoes. For purposes of further example, a user record 300C shows that a user 302C visited a page 310 associated with Footwear, followed a link to a page 320 associated with Brand 'B' Shoes, and did not take any further user action. Accordingly, a user departure may again be identified corresponding to the page 320 associated with Brand 'B' Shoes.

For purposes of yet further example, a user record 300D shows that a user 302D visited a page 310 associated with Footwear, followed a link to a page 312 associated with Men's Shoes, followed a link to a page 314 associated with Men's Casual Shoes, and finally followed a link to a page 322 associated with Model 'X' Shoe. Accordingly, a user departure may be defined if the user 302D takes no further action from the page 322. However, for the purposes of illustration, assume that user 302D purchases a shoe from the page 322 associated with the Model 'X' Shoe and that a user departure is defined as requiring that no further action is taken from a page. Accordingly, a user departure would not be identified for the page 322, as the user 302D has taken an action in purchasing the shoe.

As further discussed below with reference to FIG. 5, a user departure may be identified as a user's failure to take any of a set of possible further actions when presented with a particular page. Illustratively, a user depart rate may be determined from usage data as corresponding to a rate of user departures over time from one or more pages. Accordingly, a user depart rate may be thought of as a category of usage metric as introduced with reference to FIG. 2 above. One skilled in the relevant art will appreciate that user depart rates may be determined for any number of pages, and that any number of user click-through records may provide the basis for a determination of user depart rates corresponding to one or more pages.

One skilled in the relevant art will further appreciate that in addition to user click-through records, usage data may include records of all user interactions or clicks (e.g., clickstream data) or other page interactions generally. Specifically, for the purpose of example, usage data may include any of a variety of additional types of data associated with page or site usage, including user purchases, the addition of items to electronic wish lists or electronic shopping-carts, the addition or modification of comments or reviews, data corresponding to time spent viewing pages or content, or a variety of others.

Figure 4:
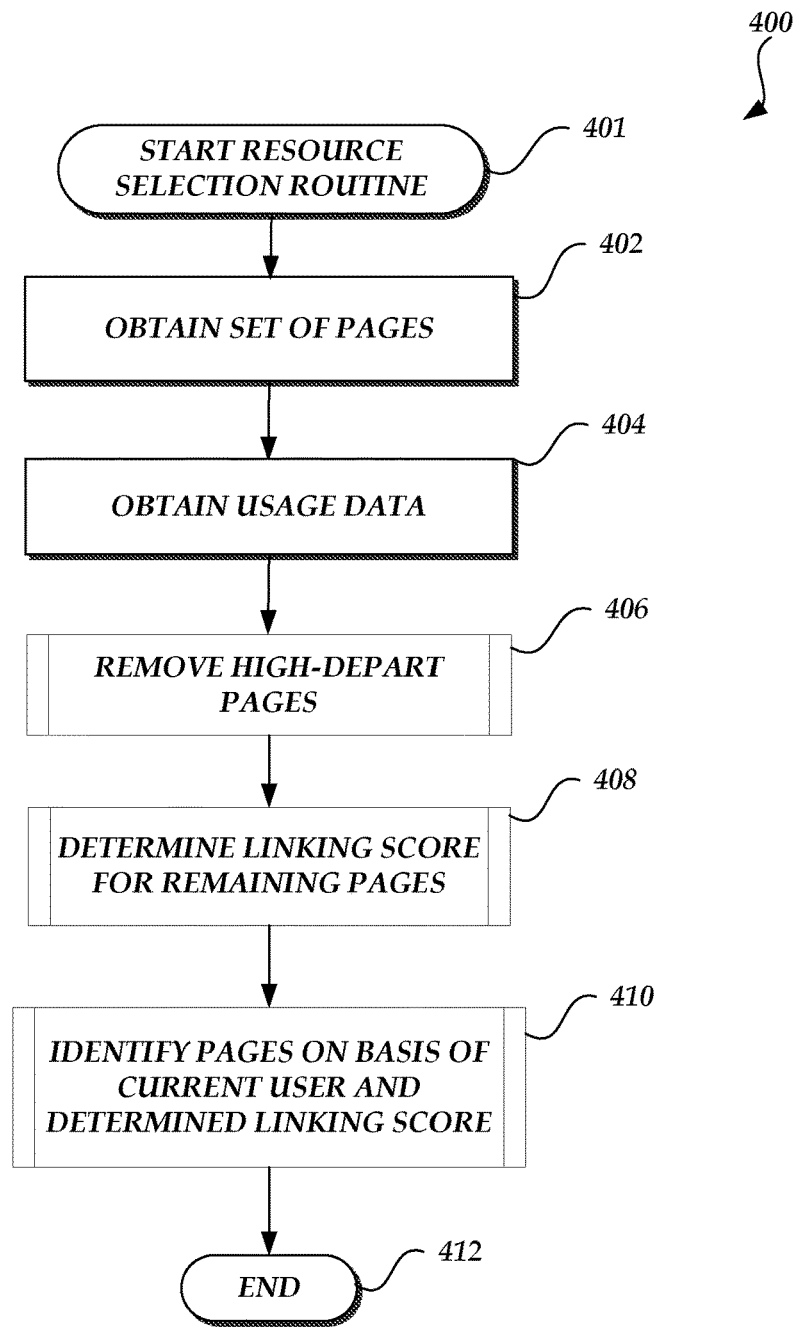
FIG. 4 is a flow diagram depicting an illustrative routine for determining a set of addressable network resources for presentation to a user.

With reference now to FIG. 4, a flow diagram depicting an illustrative routine 400 for determining a set of pages for presentation to a user is depicted. In one embodiment, the routine 400 is implemented by the resource selection component 108 of FIG. 1. Routine 400 can be executed in response to a request by a user for content including one or more pages, or may be executed prior to a user request and responsive to any other type of system event. For example, routine 400 may be implemented in response to the addition or removal of pages from the set of all pages associated with a network resource, such as a Web site. In another embodiment, routine 400 may be timed to execute at regular intervals or at a fixed or dynamically determined interval from some other system event. Illustratively, this timing may be associated with a set of physical machines hosting one or more instantiations of a resource selection component 108, or may be associated with any other set of hardware or software components associated with the network content provider service 102. In yet another embodiment, aspects of the routine may be implemented on a continuous basis. It will be appreciated by one skilled in the relevant art that aspects of the routine may be performed concurrently, sequentially, or at different times and in response to different triggering events or timings. For example, a subroutine removing pages from the set of pages may be configured to run on a continuous basis, while a second subroutine selecting pages for a user may be configured to run in response to a user request for content including one or more pages.

Returning to FIG. 4, the illustrative routine 400 begins at block 401 responsive to a system event as discussed above. At block 402, the resource selection component 108 obtains a set of pages. This set may correspond to any set of pages associated with the site. In one embodiment, the set of pages may correspond to the set of all pages currently associated with the site. In another embodiment, the set of pages may correspond to a set of pages associated with a particular area of the site. In still another embodiment, the set of pages may correspond to any other subset of pages associated with the site. For example, the set of pages may be identified by filtering or culling members of the set of all pages based on one or more criteria. The set of pages may be obtained from the data store 106 with respect to FIG. 1 or from any other storage location associated with the network content provider service 102, and may be dynamically determined on the basis of one or more criteria maintained by the network content provider service 102.

At block 404, the resource selection component 108 obtains a set of usage data associated with one or more pages. As discussed with reference to FIG. 3 above, usage data may include records of all or a subset of user clicks (e.g., clickstream data) or other page interactions generally. Usage data may also include any of a variety of types of data associated with a network resource (e.g., Web site) usage such as user purchases and click-through data, among a variety of others. In one embodiment, the resource selection component 108 may obtain this usage data from a network service that monitors user interactions with the network resource. The network monitoring service may be implemented by the network content provider service 102, or may correspond to any number of third party data gathering or monitoring services. This data may include dynamically determined data based on current user interactions, or stored usage data obtained from a data store 106 or any other storage device.

At block 406, the resource selection component 108 removes high-depart pages from the set of pages obtained in block 402. These high-depart pages may correspond to pages associated with high user depart rates as discussed above with reference to FIG. 3. An illustrative subroutine used to remove high-depart pages from the set of pages will be discussed further below with reference to FIG. 5.

At block 408, the resource selection component 108 determines a linking score for the pages remaining after the removal of high-depart pages at block 406. A linking score may be determined based at least in part upon usage data or other data associated with the network content provider service 102, including one or more user metrics determined from usage data. An illustrative subroutine used to determine linking scores for a set of pages will be discussed further below with reference to FIG. 6.

At block 410, the resource selection component 108 identifies one or more pages to be presented to a user based at least in part on a current user and/or a determined linking score. In one embodiment, the resource selection component 108 may identify pages in response to a user request for a page. This identification may be based on a linking score in conjunction with user past purchasing history or browsing behavior. In another embodiment, the resource selection component 108 may identify a set of pages simultaneously to or prior to a user request for a page. An illustrative subroutine used to identify pages will be discussed further below with reference to FIG. 7. At block 412, the routine 400 ends. For the purposes of illustration, removing high-depart pages and determining linking scores for the subset of remaining pages thus allows an illustrative network content provider to generate appropriate recommendations for a specific user based on past usage data. In various embodiments, the pages identified in routine 400 may subsequently be used to provide recommended links or suggestions to the user.

Figure 5:
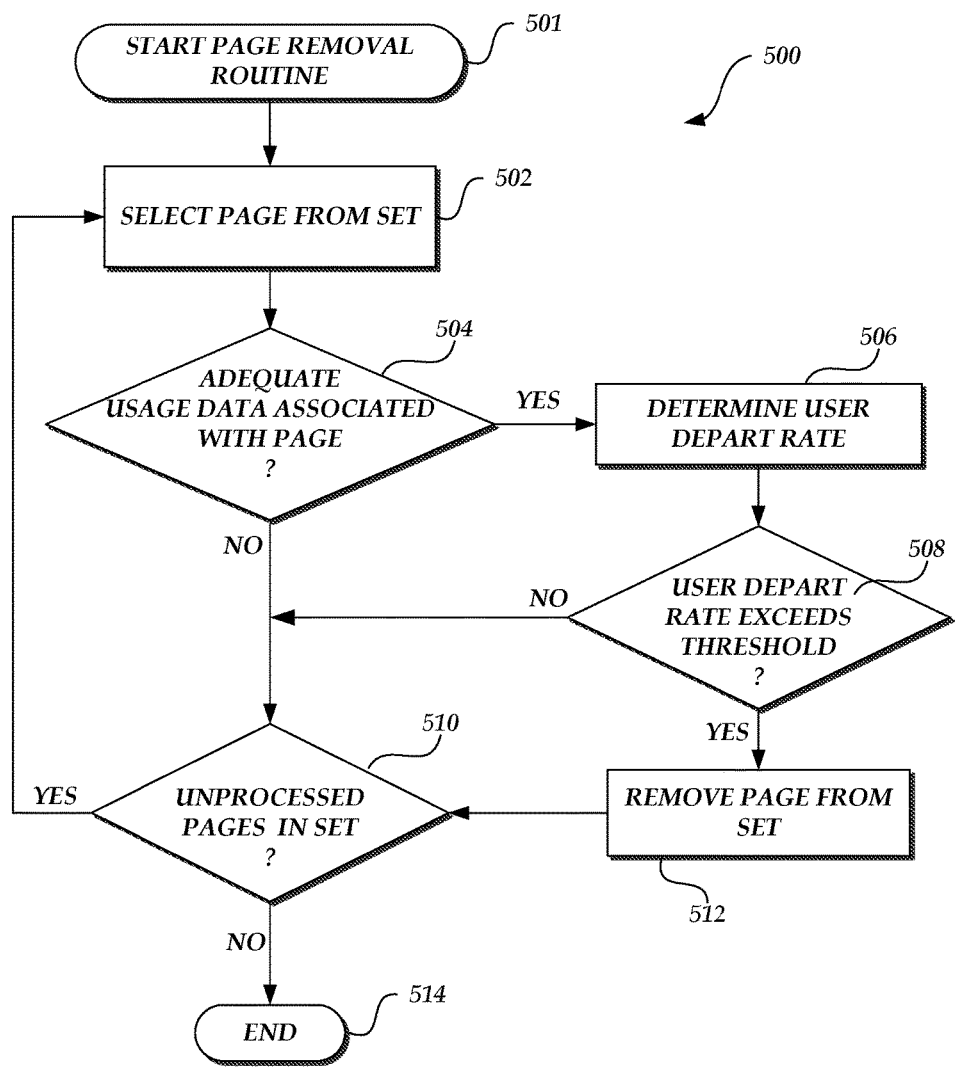
FIG. 5 is a flow diagram depicting an illustrative routine for removing high-depart addressable network resources from a set of network addressable resources.

With reference now to FIG. 5, one embodiment of a routine 500 for removing high-depart pages from a set of pages is described. Routine 500 can correspond to the subroutine described above at block 406 of FIG. 4, or can alternatively be implemented independently by the resource selection component 108 or as a part of another process implemented by the network content provider service 102. Moreover, routine 500 can be executed in response to a request for content, can be executed in response to another type of system event (such as a system timing event), or can be performed on a continuous basis.

Illustrative routine 500 begins at block 501 with a set of pages, which may be all or a subset of all of the pages associated with a particular network resource, such as a Web site. At block 502, the resource selection component 108 selects a first page from the set of pages. At decision block 504, the resource selection component 108 determines whether there is adequate usage data associated with the page to make a determination of a user depart rate usage metric. This determination may be made based at least in part on a predetermined threshold of required usage data associated with a page, on the basis of a comparison with data associated with other pages, on the basis of any of a number of statistical techniques known in the art for determining significance of a determined value, or on the basis of any other technique or criteria implemented or maintained by the network content provider service 102. For example, the resource selection component 108 can be configured such that pages with fewer than five visits by a user are considered to have insufficient associated usage data. In some embodiments, this may help prevent overzealous removal of rarely visited pages. If the resource selection component 108 determines that there is not adequate usage data associated with the page, the resource selection component 108 records or otherwise indicates that the page has been processed and the routine 500 proceeds to decision block 510. If the resource selection component 108 determines that there is sufficient user data associated with the page, the routine 500 continues to block 506, where the resource selection component 108 determines a user depart rate usage metric by identifying user departures associated with the page from the usage data.

A user departure may be identified as a user's failure to take any of a set of possible further actions when presented with a particular page. For example, a user departure may be defined as the absence of any further action taken by the user on the site. In another example, a user departure may be defined as a user not taking a further action that utilizes the links, purchasing functions, commenting functions, or other content of a page. Accordingly, a user departure may include a user starting a new browse session at a different page on the site, using a search function to find a new page not linked to by the current page, or any other action that does not utilize the links, purchasing or commenting framework, or content of a page. In still another example, a user departure event may be defined as a user failing to take a defined subset of possible actions from a particular page. For instance, a user departure may be defined as a failure to follow a dynamically determined link from a page. Accordingly, a user departure may be identified if a user follows a static link to a first page rather than a dynamically determined link to another page.

A user depart rate may be determined from the usage data as corresponding to a rate of these user departures over time associated with one or more pages. Accordingly, the user depart rate may be thought of as a category of usage metrics initially discussed above. One skilled in the relevant art will appreciate that a user depart rate may be based upon any number of user departures, and may be based on any number of click-through records, other user data including records of all or a subset of user interactions or clicks (e.g., clickstream data), or other page interactions generally. For purpose of example, usage data may additionally include any of a variety of types of data associated with network site usage, including user purchases, the addition of items to electronic wish lists or electronic shopping-carts, the addition or modification of comments or reviews, data corresponding to time spent viewing pages or content, or a variety of others.

Returning to FIG. 5, at block 508, the resource selection component 108 determines whether the depart rate determined for the page exceeds a set or determined threshold. The threshold may be predetermined or may be any of various dynamic thresholds based on one or more criteria maintained by resource selection component 108. In one embodiment, the threshold is determined based at least in part on a desired frequency of page removal. In another embodiment, the threshold may be based at least in part on a determined average user depart rate for a comparison set of pages. If the user depart rate does not exceed the threshold, the resource selection component 108 indicates that the page has been processed and the routine 500 proceeds to decision block 510. If the user depart rate exceeds the threshold of block 508, the routine 500 proceeds to block 512 and removes the page from the set of pages. Removal of one more pages from the set of pages may include logically disassociating the page from the set, deleting the page, or otherwise indicating that the page has been removed. In some embodiments, the resource selection component 108 may identify links to the removed page associated with one or more prominent addressable resources, such as a site homepage. In such embodiments, the resource selection component 108 may decrease the prominence of the removed page on a site by reassociating these links with less prominent addressable resources.

Once the page has been removed from the set of pages at block 512, the routine 500 proceeds to decision block 510 to determine whether any unprocessed pages remain in the set of pages. If unprocessed pages exist, the routine 500 returns to block 502 to select the next page. If all pages have been processed, the routine 500 ends at block 514. In various embodiments, the routine 500 thereby maintains a set of historically low-departure web pages while removing pages likely to lead to user departures. The routine 500 may accordingly result in a subset of Web pages much smaller and more manageable than the original set of all pages provided to the routine 500.

Figure 6:
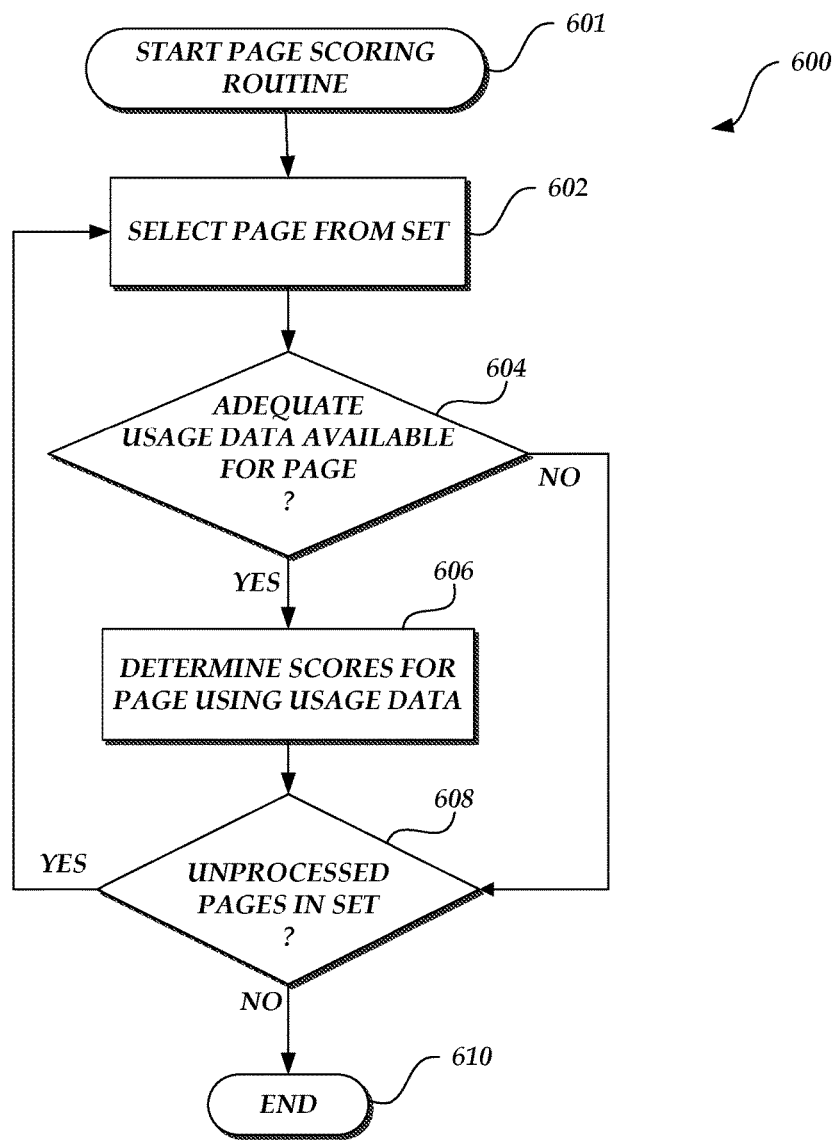
FIG. 6 is a flow diagram depicting an illustrative routine for determining a linking score for a set of addressable network resources.

FIG. 6 is a flow diagram depicting an illustrative routine 600 for generating linking scores from a set of pages. In one embodiment, routine 600 is implemented by the resource selection component 108. Routine 600 can be executed in response to a request for content or the completion of a routine such as the page removal routine of FIG. 5. Routine 600 can alternatively be executed in response to another other type of system event (including a system timing event) or performed on a continuous basis.

The illustrative routine 600 begins at block 601 with a set of pages. The set may be a subset of all pages associated with a particular network resource or site as generated by the page removal routine 500 of FIG. 5. In some embodiments, a limited subset of pages may be desired in order to minimize the computational requirements of score generation. In other embodiments, the set of pages may consist of any of a variety of other sets of pages associated with a particular content provider.

At block 602, the resource selection component 108 selects a first page from the set of pages. At decision block 604, the resource selection component 108 determines whether there is adequate usage data associated with the page to make a determination of one or more linking scores. This determination may be made based at least in part on a predetermined threshold of required usage data associated with a page, on a comparison with data associated with other pages, on a number of statistical techniques known in the art for determining significance of a determined value, or on any other technique or criteria implemented or maintained by the network content provider service 102. For example, the resource selection component 108 can be configured such that pages with fewer than five visits by a user are considered to have insufficient associated usage data. In another example, the resource selection component 108 can be configured such that a page must have enough usage data to calculate a number of different usage metrics as discussed below. In one embodiment, a page may be required to have enough associated user data to determine a user click-through rate, an aggregate purchase value, and an average time spent viewing. If the resource selection component 108 determines that there is not adequate usage data associated with the page, the resource selection component 108 indicates that the page has been processed and the routine 600 proceeds to decision block 608. If the resource selection component 108 determines that there is sufficient user data associated with the page, the routine 600 continues to block 606 and the resource selection component 108 determines one or more linking scores.

At block 606, the resource selection component 108 determines one or more linking scores for the page on the basis of usage data. For purposes of example, usage data may include records of all user clicks (e.g., clickstream data) or other page interactions generally, including any of a variety of types of data associated with site usage such as user purchases, and click-through data, the addition of items to electronic wish lists or electronic shopping-carts, the addition or modification of comments or reviews, data corresponding to time spent viewing pages or content, or a variety of others.

In some embodiments, various usage metrics may be determined from the usage data. The usage metrics may represent various rates, quantities, and values associated with various user actions or site activities, including but not limited to page click through rates, user depart rates, user purchase rates, customer satisfaction or customer review scores, shopping cart or wish list add rates, review add rates, comment add rates, link forwarding rates through e-mail or some other social media, product return rates, average or aggregate user purchase value or volume, average or aggregate profit, value of ad-driven revenue, or average time spent viewing. The usage metrics may be broken down by area of interest or associated with a particular user or group or category of users. A linking score may be based on any usage metric or combination of usage metrics. In one embodiment, pages associated with a brand of products may have a score associated with the aggregate sales figures for the respective brand, a score associated with user click-through rates to specific products of the brand, and a score associated with the average number of positive comments left for products of the brand.

It will be appreciated by those skilled in the art that any number of linking scores may be generated for a page. A linking score may in turn be based on any number of user metrics or volume of user data, or correspond to any other criteria maintained by the network content provider service 102. In one embodiment, all pages may have linking scores assigned on the basis of the same user metric or criteria in order to allow for simple comparisons between pages. In another embodiment, some subsets of pages may have linking scores assigned on the basis of different metrics to allow easy comparison only within that subset of linking scores. It will be appreciated by those skilled in the art that linking scores may be determined or stored in any alphanumerical or binary format, may scale in terms of any function (e.g., linear, logarithmic, etc.), and may be determined to any place value or level of significance.

Returning to FIG. 6, once one or more linking scores have been determined for the page at block 606, the routine 600 moves to decision block 608, where the resource selection component 108 determines whether any unprocessed pages remain in the set of pages. If unprocessed pages exist, the routine 600 returns to block 602 and the resource selection component 108 selects the next page. If all pages have been processed, the routine 600 ends at block 610. The routine 600 thus terminates having generated linking scores for one or more pages associated with the network content provider. In some embodiments, these linking scores may subsequently be utilized to select pages or links for a user, as illustrated below with reference to FIG. 7.

Figure 7:
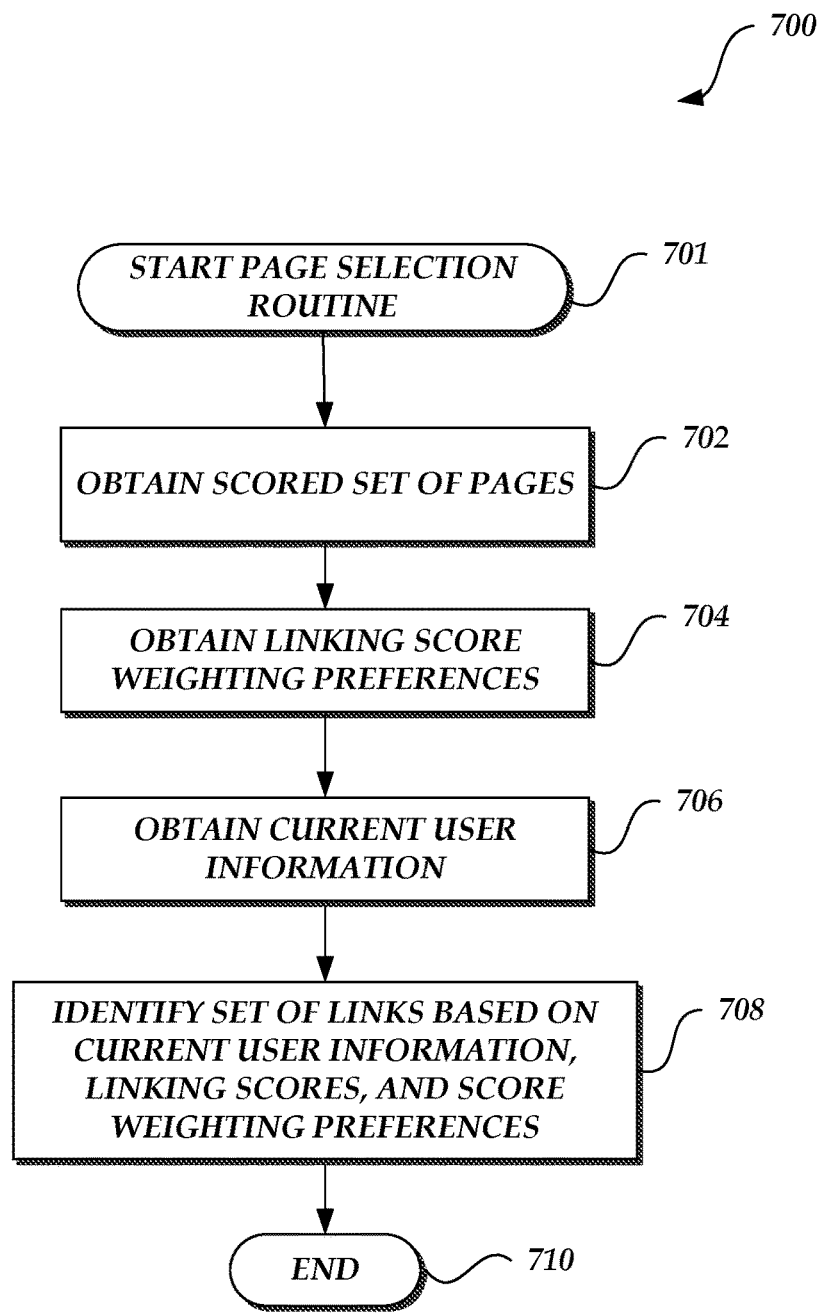
FIG. 7 is a flow diagram depicting an illustrative routine for identifying a set of addressable network resources based on linking scores.

FIG. 7 is a flow diagram depicting an illustrative routine 700 for identifying links to pages. In one embodiment, routine 700 is implemented by the resource selection component 108. Routine 700 may begin at block 701 in response to a request for content or upon the completion of a routine such as the page scoring routine 600 of FIG. 6.

At block 702 the resource selection component 108 obtains a set of scored pages. This set may be a subset of all pages associated with a particular content provider as generated by the page removal routine 500 of FIG. 5. In an alternate embodiment, the set of pages may consist of all or a subset of all of the pages associated with a network resource or site. Some pages of the set may have one or more linking scores associated with them. In one embodiment, the linking scores are generated by the scoring routine 600 of FIG. 6. These pages and associated linking scores may be obtained directly from a dynamic routine, such as the scoring routine 600 of FIG. 6, or may be obtained from a data store 106 or any other storage device.

At block 704 the resource selection component 108 obtains a set of score weighting preferences. Score weighting preferences may be one or more values associated with one or more types of linking scores, allowing scores to be weighted to emphasize a desired objective. For example, one or more pages of the set of pages may each have two linking scores: a first linking score based at least in part on user click-through rate; and a second linking score based at least in part on aggregate purchase value of linked pages. In another example, there may be score weighting preferences associated with any number of linking scores or categories of linking scores. Score weighting preferences may correspond to any number of usage metrics, or any other categorization of linking scores. In one embodiment, weighting preferences may be predetermined or may be dynamically determined to emphasize one or more desired objectives. Desired objectives may include any of a variety of possible objectives, including encouraging user education or familiarity with products of one or more brands, encouraging user exploration of a site, reducing user depart rates, increasing the value or volume of purchases, encouraging a high user involvement with the site (e.g. encouraging user comments or contributions), or any other business related objective.

At block 706, the resource selection component 108 obtains information about a current user. The user information may correspond to any number of user preferences, stored user attributes or account information, or user history data. For example, the information may include any of a number of types of information including but not limited to user name, birthday or other identifying or demographic information, user provided product or site preferences, user purchasing or viewing preferences determined from past site usage, user spending patterns, and a variety of other data relating to user information or user patterns. For example, a user may have information associated with a user account defining a user name, and site preferences, as well as associated purchasing information showing a history of purchases of brand "B" products. This information may be dynamically determined, or may be obtained from data store 106 or any other storage device.

At block 708 the resource selection component 108 identifies sets of links based on current user information, linking scores, and score weighting preferences. For the purposes of example, assume that a page associated with brand "A" products has a score of 51.7 associated with user click-through rates to product pages, and a score of 25.5 associated with an aggregate user purchase value of linked products. Assume for further example that a page associated with brand "B" products has a score of 30.1 associated with user click-through rates to product pages, and a score of 50.5 associated with an aggregate user purchase value of linked products. It will be appreciated by those skilled in the art that linking scores may be determined or stored in any alphanumerical or binary format, may scale in terms of any function (e.g. linear, logarithmic, etc), and may be determined to any place value or level of significance.

In one embodiment, these linking scores may be adjusted by one or more score weighting preferences to generate a weighted linking score. As discussed above, score weighting preferences may be predetermined or may be dynamically determined to emphasize one or more desired objectives. For the purpose of example, assume that score weighting preferences have been defined to emphasize the desired outcome of user exploration and familiarization with a product line. Illustratively, for this example, assume a first score weighting preference corresponding to a user click-through rate will weight associated linking scores at 200% of their value. Assume for further example that a second score weighting preference corresponding to aggregate purchase value will weight associated linking scores at 80% of their value. Thus, this example accordingly places an emphasis on user exploration (e.g., following links to products) at the expense of potential sales. An alternate embodiment might place greater emphasis on sales by giving a higher weighting to linking scores associated with aggregate purchase value.

Applying the above example for the purposes of illustration, the page associated with products of brand "A" may have a weighted score of 93.4 associated with user click-through rates to brand "A" product pages, representing the original linking score of 51.7 adjusted by the weighting preference of 200% corresponding to user click rates. The page may likewise have a weighted linking score of 20.4 associated with aggregate user purchase value, representing the original linking score of 25.5 adjusted by the weighting preference of 80% corresponding to user click rates. The page associated with brand "B" products may accordingly have a weighted linking score of 60.2 associated with user click-through rates (30.2 original score adjusted by 200% score weighting preference), and a score of 40.4 associated with an aggregate user purchase value of linked brand "B" products (50.5 original score adjusted by 80% score weighting preference).

It will be appreciated by those skilled in the art that the above examples are provided only for purposes of illustration, and that the network content provider service 102 may determine any number of score weighting preferences corresponding to one or more linking scores, usage metrics, or categories, and that weighted linking scores may be determined on the basis of any number of linking scores or score weighting preferences. In various embodiments, a weighted linking score may be determined as a discrete value to aid in the identification of one or more pages, or the resource selection component 108 may be configured to implicitly adjust a linking score by a score weighting preference in the identification of a page. It will further be appreciated that score weighting preferences may be determined, stored, or applied to obtain a weighted linking score in any alphanumerical or binary format, may scale in terms of any function (e.g., linear, logarithmic, etc.), and may be determined to any place value or level of significance.

Returning to the above example, the resource selection component 108 may identify one or more links 208 to pages as illustrated in FIG. 2 based on criteria such as weighted or unweighted linking scores, or any other criteria maintained by the network content provider service 102. This identification may be based on a single or aggregate score value corresponding to a single page, or on a comparison of scores or criteria between or among pages. Specifically, the resource selection component 108 may make its identification in the context of user information obtained in block 706 above. For instance, the resource selection component 108 may identify the page associated with brand "B" on the basis of its weighted linking scores in combination with user information showing a preference for brand "B" products. In another embodiment, resource selection component 108 may identify a page associated with brand "A" on the basis of its weighted linking score despite user information showing a preference for brand "A" products. The resource selection component 108 may select any number of links 208 corresponding to pages. These links may be associated with a page as illustrated in FIG. 2 and/or presented to a current user, or may be stored for future association with pages or other content or future presentation to a user. At block 710 the routine ends, having identified one or more links 208 corresponding to pages. In various embodiments, these links may be provided to the user in the context of one or more pages as illustrated in FIG. 2. In alternate embodiments, these links may be utilized to provide recommendations or suggestions to users visiting a network-based site.

Figure 8:
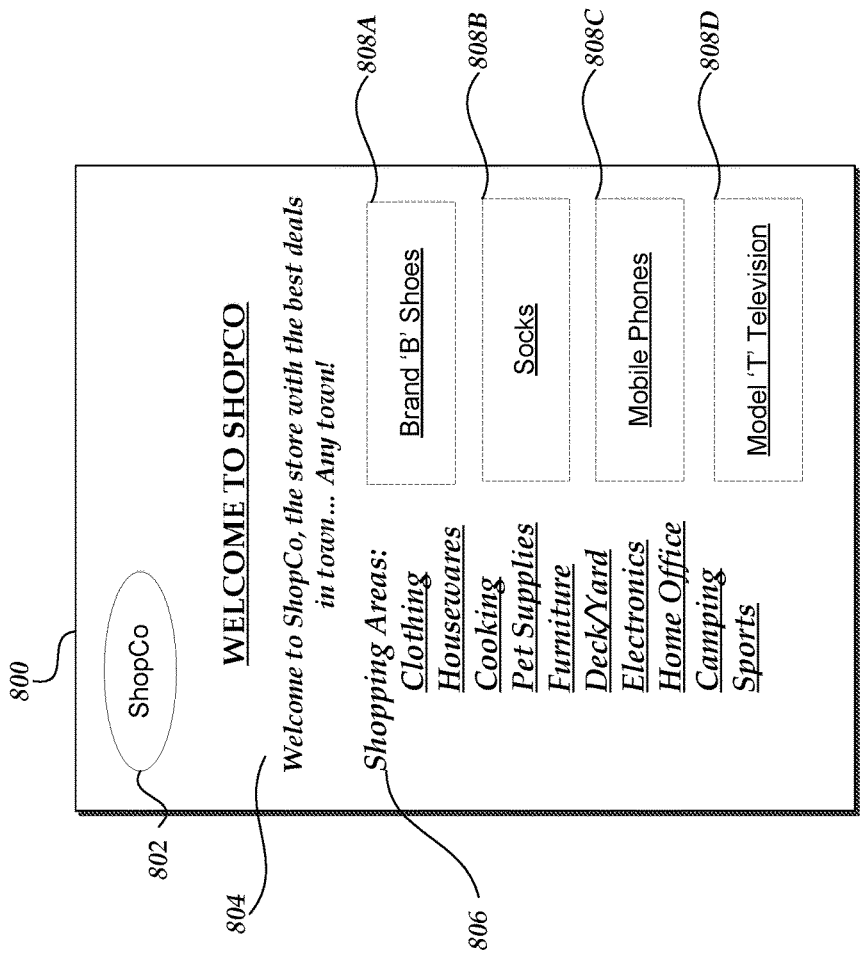
FIG. 8 is a schematic diagram of an illustrative addressable network resource with associated links to identified addressable network resources.

FIG. 8 is a schematic diagram depicting an illustrative embodiment of a prominent page on a site (e.g., a home page). In the illustrated example, the prominent page 800 may include one or more dynamically determined links 808A-808D associated with pages identified by the resource selection routine described in FIG. 4 above. In response to a user request or any other system event, these links 808A-808D to identified pages may be surfaced or associated with the prominent page 800. The page 800 may additionally contain various other content that is included each time the page is presented, such as branding 802 and various additional content 804 or additional links 806. The additional content 804 may include advertisements or content presented as text, images, audio, video, etc. The additional links 806 may be static or dynamically determined through an alternate linking algorithm, and may be provided in addition to the dynamically determined links 808A-808D. The additional links 806 may enable a user to take some action (e.g., purchase, comment, add to a wish list or shopping cart) or obtain more information about a product or group.

The links 808A-808D may correspond to any of one or more pages identified by the resource selection routine described in FIG. 4 above. By associating identified page links 808A-808D with a prominent page 800, a site manager may drive traffic to popular areas of the site and encourage desired objectives and user behavior. In various embodiments, a prominent page may be predetermined by a site manager, or may be dynamically determined based on various usage metrics or usage data.

It will be appreciated by those skilled in the art and others that all of the functions described in this disclosure may be embodied in software executed by one or more processors of the disclosed components and communications devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for selecting webpages comprising:
  a memory component for storing a set of webpages and one or more webpage scores, wherein each of the one or more webpage scores is associated with a respective webpage; and
  a webpage selection component operative to:
    obtain usage data associated with one or more members of the set of webpages;
    determine a user depart rate associated with a first webpage of the set of webpages, wherein the user depart rate corresponds to a rate at which users fail to select a link on the first webpage, and wherein the user depart rate is based upon the usage data associated with the first webpage;
    remove the first webpage from the set of webpages based upon the associated user depart rate exceeding a threshold;
    determine a first webpage linking score associated with each remaining one or more members of the set of webpages, wherein individual first webpage linking scores for each of the remaining one or more members of the set of webpages are determined based upon a usage metric determined from the usage data associated with each respective webpage;
    obtain information regarding a current user; and
    identify a second webpage in the remaining one or more members of the set of webpages for providing to the current user based on at least the first webpage linking score associated with the second webpage and the obtained information regarding the current user.

2. The system of claim 1, wherein the usage metric includes at least one of a click through rate, the user depart rate, a user purchase rate, a customer satisfaction or aggregate review score, a shopping cart add rate, a review add rate, a comment add rate, a link forwarding rate, a product return rate, an average or aggregate user purchase value, an average or aggregate profit, or an average time spent viewing.

3. The system of claim 1, wherein the webpage selection component is further operative to determine a second webpage linking score associated with each of one or more members of the set of webpages.

4. The system of claim 3, wherein the second webpage linking score is based on a different usage metric than the first webpage linking score.

5. The system of claim 4, wherein the webpage selection component is further operative to obtain a set of score weighting preferences corresponding to the different usage metrics.

6. The system of claim 5, wherein the set of score weighting preferences corresponds to one or more objectives including at least one of reducing user depart rate, increasing value per user purchase, increasing average number of user purchases, increasing user awareness of products and features, or increasing total user purchase value.

7. The system of claim 6, wherein the webpage selection component is further operative to determine a weighted score based on a webpage score and a score weighting preference corresponding to the usage metric that the webpage score is based upon.

8. A computer-implemented method comprising:
  obtaining usage data associated with one or more members of a set of webpages;
  determining a user depart rate associated with a first webpage of the set of webpages, wherein the user depart rate corresponds to a rate at which users fail to select a link on the first webpage, and wherein the user depart rate is based upon the usage data associated with the first webpage;

removing the first webpage from the set of webpages based upon the associated user depart rate exceeding a threshold;

determining a first webpage linking score associated with each remaining one or more members of the set of webpages, wherein individual first webpage linking scores for each of the remaining one or more members of the set of webpages are determined based upon a usage metric determined from the usage data associated with each respective webpage;

obtaining information regarding a current user; and identifying a second webpage in the remaining one or more members of the set of webpages for providing to the current user based on at least the first webpage linking score associated with the second webpage and the obtained information regarding the current user.

9. The computer-implemented method of claim 8, wherein the usage metric includes at least one of a click through rate, the user depart rate, a user purchase rate, a customer satisfaction or aggregate review score, a shopping cart add rate, a review add rate, a comment add rate, a link forwarding rate, a product return rate, an average or aggregate user purchase value, an average or aggregate profit, or an average time spent viewing.

10. The computer-implemented method of claim 9 further comprising determining a second webpage linking score associated with each of one or more members of the set of webpages.

11. The computer-implemented method of claim 10, wherein the second webpage linking score is based on a different usage metric than the first webpage linking score.

12. The computer-implemented method of claim 11 further comprising obtaining a set of score weighting preferences corresponding to the different usage metrics.

13. The computer-implemented method of claim 12, wherein the set of score weighting preferences corresponds to one or more objectives including at least one of reducing user depart rate, increasing value per user purchase, increasing average number of user purchases, increasing user awareness of products and features, or increasing total user purchase value.

14. The computer-implemented method of claim 13 further comprising determining a weighted score based on a webpage score and a score weighting preference corresponding to the usage metric that the webpage score is based upon.

15. A non-transitory, computer-readable storage medium having computer-executable modules for managing resources, the computer-executable modules comprising:

one or more modules configured to:

obtain usage data associated with one or more members of a set of webpages;

determine a user depart rate associated with a first webpage of the set of webpages, wherein the user depart rate corresponds to a rate at which users fail to select a link on the first webpage, and wherein the user depart rate is based upon the usage data associated with the first webpage;

remove the first webpage from the set of webpages based upon the associated user depart rate exceeding a threshold;

determine a first webpage linking score associated with each remaining one or more members of the set of webpages, wherein individual first webpage linking scores for each of the remaining one or more members of the set of webpages are determined based upon a usage metric determined from the usage data associated with each respective webpage;

obtaining information regarding a current user; and identify a second webpage in the remaining one or more members of the set of webpages for providing to the current user based on at least the first webpage linking score associated with the second webpage and the obtained information regarding the current user.

16. The non-transitory, computer-readable storage medium of claim 15, wherein the usage metric includes at least one of a click through rate, the user depart rate, a user purchase rate, a customer satisfaction or aggregate review score, a shopping cart add rate, a review add rate, a comment add rate, a link forwarding rate, a product return rate, an average or aggregate user purchase value, an average or aggregate profit, or an average time spent viewing.

17. The non-transitory, computer-readable storage medium of claim 15, wherein the one or more modules are further configured to determine a second webpage linking score associated with each of one or more members of the set of webpages.

18. The non-transitory, computer-readable storage medium of claim 17, wherein the second webpage linking score is based on a different usage metric than the first webpage linking score.

19. The non-transitory, computer-readable storage medium of claim 18, wherein the one or more modules are further configured to obtain a set of score weighting preferences corresponding to the different usage metrics.

20. The non-transitory, computer-readable storage medium of claim 19, wherein the set of score weighting preferences corresponds to one or more objectives including at least one of reducing user depart rate, increasing value per user purchase, increasing average number of user purchases, increasing user awareness of products and features, or increasing total user purchase value.

21. The non-transitory, computer-readable storage medium of claim 20, wherein the one or more modules are further configured to determine a weighted score based on a webpage score and a score weighting preference corresponding to the usage metric that the webpage score is based upon.

* * * * *